United States Patent [19]
Kelly et al.

[11] Patent Number: 5,100,464
[45] Date of Patent: Mar. 31, 1992

[54] STEEL MILL BY-PRODUCT MATERIAL BRIQUETTES AND PELLETS

[75] Inventors: James J. Kelly, Schererville, Ind.; Thomas P. Barnett, Joliet, Ill.

[73] Assignee: Womco, Inc., LaJolla, Calif.

[21] Appl. No.: 491,282

[22] Filed: Mar. 9, 1990

Related U.S. Application Data

[63] Continuation-in-part of Ser. No. 397,103, Aug. 21, 1989, abandoned.

[51] Int. Cl.⁵ .............................................. C22B 1/243
[52] U.S. Cl. ......................................... 75/321; 75/322
[58] Field of Search .......................... 75/322, 321, 326

[56] References Cited

U.S. PATENT DOCUMENTS

| | | | |
|---|---|---|---|
| 2,417,493 | 3/1947 | Holz | 75/322 |
| 4,066,469 | 1/1978 | Shiel et al. | 106/736 |
| 4,405,372 | 9/1983 | Serafin et al. | 106/727 |
| 4,585,475 | 4/1986 | Fosnacht | 75/773 |

FOREIGN PATENT DOCUMENTS 150025  8/1984  Japan ..................................... 75/773

*Primary Examiner*—Melvyn J. Andrews
*Attorney, Agent, or Firm*—Reed Smith Shaw & McClay

[57] ABSTRACT

Steel mill by-product material briquettes or pellets and processes for making the same that results in a briquetted or cold agglomeration pelleted material made from by-product material and a binder comprising gypsum-free cement and sucrose residue for the briquettes or a binder comprising gypsum-free cement and, if required, a sucrose residue for the pellets. These briquettes or pellets are made using a cold roll briquetting process or a cold agglomeration pelletizing process at ambient temperature and can be fed directly into a blast furnace thereby recycling by-product materials while completely by-passing the environmentally adverse and costly sintering process or landfill disposal process.

11 Claims, 4 Drawing Sheets

STEEL MILL BY-PRODUCT MATERIAL BRIQUETTES AND PELLETS

CROSS REFERENCES TO RELATED APPLICATIONS

This application is a continuation-in-part of copending application Ser. No. 07/397,103, filed Aug. 21, 1989 entitled "Steel Mill By-Product Material Briquettes and Process of Making the Same," now abandoned.

FIELD OF THE INVENTION

The present invention relates to briquettes and cold agglomerated pellets, made from steel mill by-product material at ambient temperature, which can be fed directly into a blast furnace thereby recycling the energy and metallic values contained in the by-product materials while by-passing the sintering plant and the sintering process. Processes for making these briquettes and pellets are also disclosed.

BACKGROUND OF THE INVENTION

Although the briquetting and pelletizing processes are well known in the iron and steel industry, these processes have not been used successfully to recycle various steel mill waste materials with a significant iron content to the blast furnace. Historically, these waste materials, such as iron pellet fines, steelmaking slag, mill scale, blast furnace flue dust, and sludge (see Table 1 below for a more detailed description), had to be processed through a sintering step to reclaim the iron, flux, and manganese units contained therein. Sintering plants and the sintering process, however, are asserted to produce adverse environmental impact and are expensive to operate. If the material was not processed through a sintering plant, it had to be disposed of in a landfill.

TABLE 1

| | Typical Steel Mill By-Products | | | |
|---|---|---|---|---|
| Waste Product | Percent Fe | Percent C | Percent SiO$_2$ | Percent CaO & MgO |
| Steel Making Slag | 18-24 | — | 10-15 | >40 |
| Blast Furnace Dust | 27-37 | 25-34 | 13-17 | 3-5 |
| Blast Furnace Sludge | 25-35 | 27-39 | 14-20 | 2-4 |
| Mill scale, Slab Caster | 69-72 | — | <1 | trace |
| Mill scale, Hot Strip Mill | 64-69 | — | <1 | trace |

The steel industry has used the cold briquetting process to briquette materials of value to be added to a basic oxygen steelmaking furnace, such as flourspar or a mixture of flourspar and mill scale. The traditional lime and molasses binder used in these briquettes cannot be used, however, to yield a briquette strong enough to allow the material to be conveyed to a blast furnace and travel gradually from ambient temperature to up to 2000° F. (the softening zone of the furnace) without disintegrating into fines which would choke off the gas flow within the furnace, blanket the furnace burden, or escape into the furnace flue gas and overload the flue gas cleaning system.

The process of briquetting materials of value has been refined to use a Portland cement and molasses binder to increase the crush strength of the briquettes. See U.S. Pat. No. 3,871,869 (flourspar, ferrous metals, calcium flux, and colemanite); D. Slatter, The Use of Cement/Molasses Instead of Lime/Molasses as Binders in Briquetting Chrome Ore Fines, Proceedings of the 19th Biennial IBA Conference, pp. 237-51 (Sept. 1985). However, a process of briquetting steel mill by-product material into briquettes that are strong enough to be recycled directly into a blast furnace has not been developed.

The steel industry has also long used a pelletizing process to pelletize iron ore fines from the ore mining and benefaction process into pellets that are fed directly into the blast furnace. However, a cold process, as well as a hot process, of pelletizing steel mill by-product material into pellets that are strong enough to be recycled directly into a blast furnace has not been heretofore developed.

It would be desirable, therefore, if there were steel mill by-product material briquettes or pellets and processes of making these briquettes or pellets that resulted in a recyclable product which could be fed directly into a blast furnace, thus eliminating the need for a sintering step without adversely affecting the performance and operation of the blast furnace.

SUMMARY OF THE INVENTION

Generally, the present invention provides for a briquette or cold agglomerated pellet made from steel mill by-product material and processes for making the same such that the briquettes or pellets can be fed directly into an iron blast furnace. Typically, the briquettes or cold agglomerated pellets can constitute up to 20% by weight of the overall metallic furnace burden. The briquettes comprise by-product material and a binder comprising molasses or other sucrose residue and a gypsum-free cement; the process for making the briquettes occurs preferably at ambient temperature using a conventional roll press. The pellets comprise by-product material, water, and a binder comprising gypsum-free cement, and, in some instances, molasses or other sucrose residue; the cold agglomerating process for making the pellets occurs preferably at any ambient temperature above the freezing point using a conventional pelletizer.

The strength of the briquettes can be controlled by adjusting the proportions of gypsum-free cement and molasses or other sucrose residue as the surface area and grain fineness of the by-product material vary. Likewise, the strength of the pellets can be controlled by adjusting the proportions of water, gypsum-free cement, and molasses or other sucrose residue (if required) as the surface area and grain fineness of the by-product material vary. In the briquetting process, the molasses is believed to control the setting time of the binder, while molasses may also be used in the pelletizing process if needed for adhesion. The removal of much of the gypsum from the cement enhances the ultimate strength of the briquette or pellet and reduces the unwanted sulphur component contained in cements that use gypsum ($CaSO_4 \cdot 2H_2O$) to control the setting time. Residual amounts of gypsum in the gypsum-free cement are tolerated, provided it does not interfere in the performance of the briquette as described herein.

The processes produce a briquette or pellet with sufficient green strength to resist crumbling as the briquette or pellet moves from the briquette press or the pelletizer to the curing area. After curing, the briquette or pellet achieves a sufficient ultimate strength to prevent disintegration and to limit the generation of resultant fines during the conveying process to the blast furnace. Further, the briquette or pellet achieves a sufficient ultimate strength to maintain its physical integrity in the high temperatures and under the high pressures of a blast furnace as the briquette or pellet travels into the softening zone of the furnace.

The process of making the briquette comprises the steps of: (a) conveying the by-product material to a mixing/blending/conditioning mill where it is combined with the proper proportions of a gypsum-free cement and molasses binder material; (b) feeding the mix to cold roll presses to produce a briquette; and (c) conveying the pressed briquette to a curing/hardening area. The process of making the cold agglomerated pellets comprises the steps of: (a) conveying or pumping the by-product material to a slurry tank where it is thoroughly mixed to form a feed slurry comprising 10 to 50% solids; (b) pumping the feed slurry to a filter where it is dewatered to produce a by-product material filter cake comprising 88 to 92% solids; (c) conveying the filter cake to a mixing/blending/conditioning mill where it is combined with gypsum-free cement that comprises 3 to 10% by weight of the blended material and, if required, molasses or other sucrose residue that comprises 0 to 10% by weight of the blended material; (d) feeding the mix to a cold pelletizer that produces ¼ to ¾ inch pellets; (e) passing the pellets through a screen/perforated belt dryer operating in the range of 300° to 400° F. to form a hard dried outer surface on the pellets; and (f) conveying the semi-dried pellets to a curing/hardening area. After the briquettes or pellets cure and reach their ultimate strength, they can be conveyed directly into a blast furnace as part of the overall burden to the furnace, thus completely by-passing the environmentally damaging and costly sintering plant process.

Other details, objects, and advantages of the present invention will become more readily apparent from the following description of a presently preferred embodiment thereof.

BRIEF DESCRIPTION OF THE DRAWINGS

In the accompanying drawings, a preferred embodiment of the present invention is illustrated, by way of example only, wherein.

DESCRIPTION OF THE PREFERRED EMBODIMENT

Figure 1:
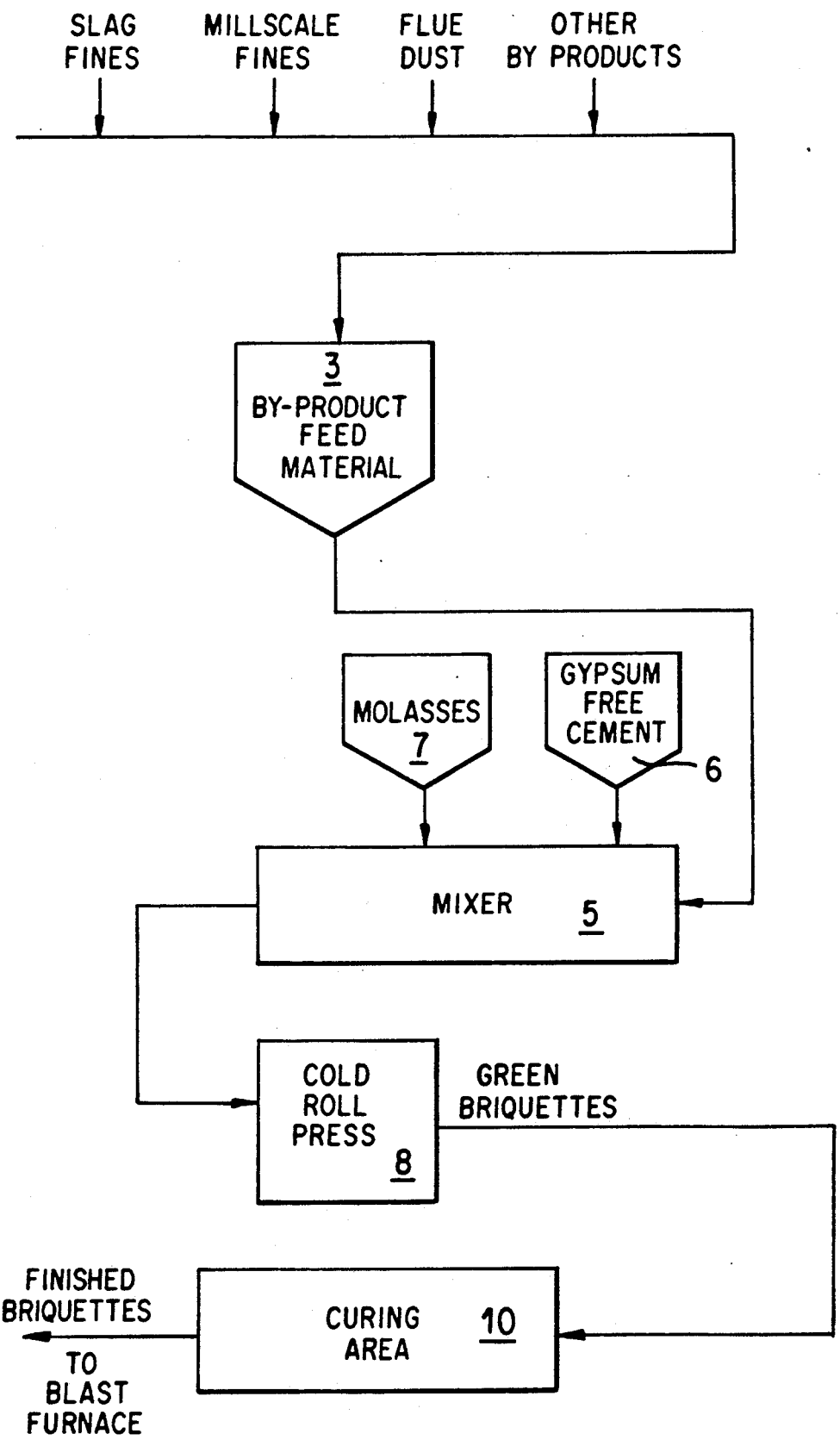
FIG. 1 is a flow diagram of the basic process of making the briquettes of the present invention.
Figure 2:
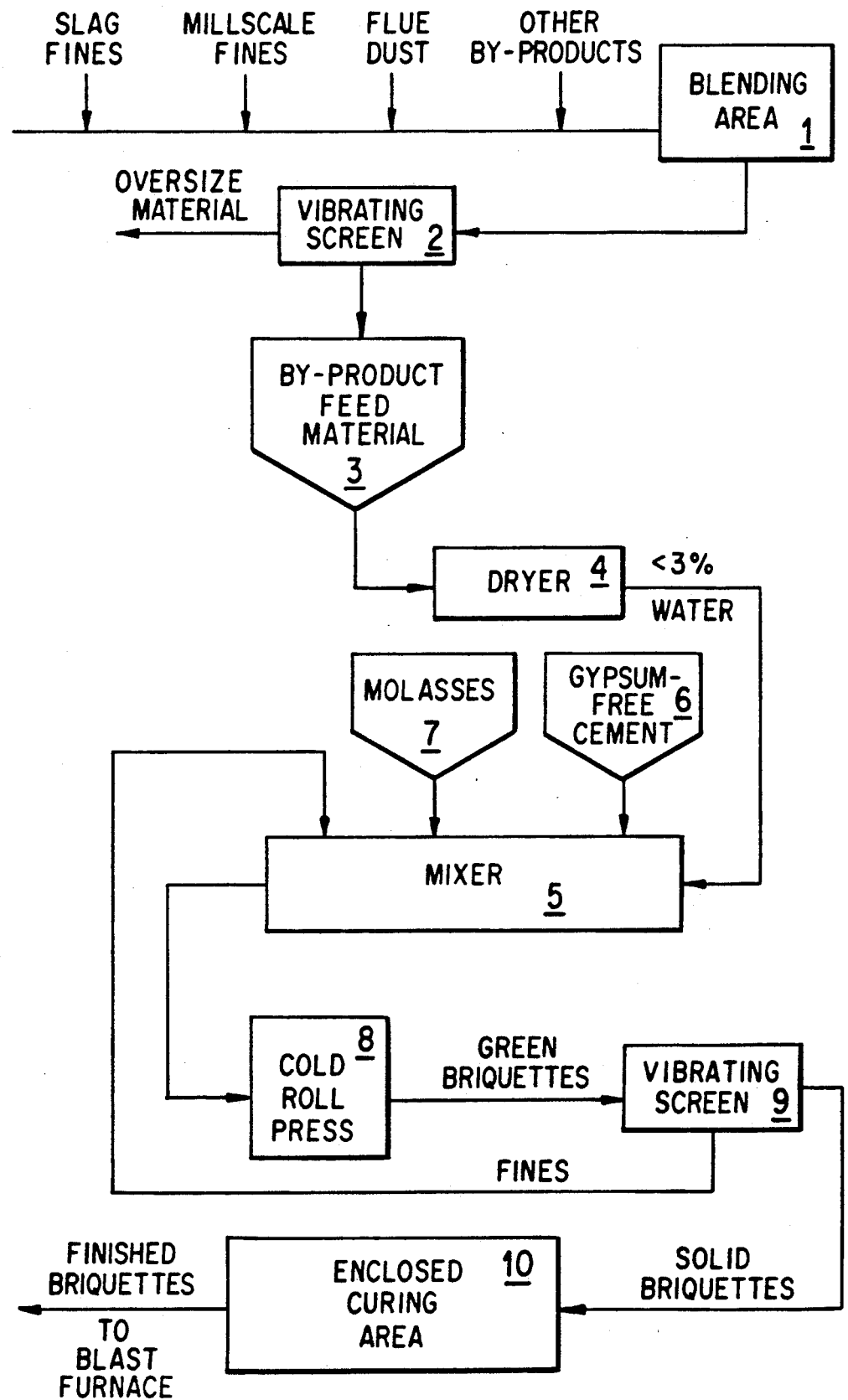
FIG. 2 is a flow diagram of a preferred embodiment of the present invention for making briquettes.

Referring to FIGS. 1 and 2 for the briquetting process, the various by-product materials, such as iron pellet fines, steelmaking slag, mill scale, and blast furnace flue dust are transported to the receiving area 1 where they are blended in the preferred embodiment of the invention. Next, the material is fed to a vibrating screen 2 that removes oversized material before the by-product material, which passes through the screen, is transferred to appropriately sized hoppers 3 for processing. The separation required at the vibrating screen 2 is a function of the size of the briquettes produced by the cold roll presses 8. A ½-inch screen should be used when pressing briquettes in the typical diameter size range of 2 to 3 inches. In the preferred embodiment, this feed material is then fed to a dryer 4 that uses the most economical energy source available to reduce excess free surface moisture to less than 3% by weight.

From the dryer, the material is conveyed into a pug mill 5, or other suitable mixing device known to those skilled in the art, where it is combined with the binder of the present invention—gypsum-free cement 6 and molasses 7. This blended material is then fed to cold roll presses 8 which form the by-product material into briquettes. The green briquettes then pass over a second vibrating screen 9 to separate out any unbriquetted fine material before the processed briquettes are conveyed to the curing area 10. The unbriquetted fines are then returned to the mixer 5 for processing.

After curing to sufficient strength, the briquettes are conveyed to and fed directly into the blast furnace. The fully cured briquettes produced by this process are able to maintain their physical integrity such that at least 70% of the briquette material remains on a ¼-inch screen after 200 revolutions in the ISO-3271-1985 E Tumble Test Procedure ("Tumble Test").

For process control, the by-product material is fed from the hopper 3 via a weigh-feeder or related device known to those skilled in the art. The gypsum-free cement 6 and molasses 7 binder materials are then fed into the mixing device at rates to meet a predetermined ratio of binder to by-product material based on test runs of the particular feed mix. Preferably, the end product briquettes consist of 4% to 10% gypsum-free cement and less than 8% molasses by weight, with the remaining 82% to 92% being by-product material. The percentages of gypsum-free cement and molasses may need to be increased to a maximum of 15% for each binder material, however, because of the variable surface area and grain fineness of the by-product material.

The following are three examples of the overall briquette binder additives required to pass the Tumble Test in trial runs using various steel mill by-product feed mixes:

| Components of Feed Mix | Percent By Weight | | |
|---|---|---|---|
| | Initial Testing | Extended Trial Run A | Extended Trial Run B |
| Mill scale | 41 | 33.3 | 33.3 |
| Steelmaking Slag | 19 | 33.3 | 33.3 |
| Blast Furnace Flue Dust | 40 | 33.3 | 33.3 |
| Binder in Briquettes | | | |
| Gypsum-Free Cement | 11.5 | 9 | 8 |
| Molasses | 8 | 6 | 6 |

Figure 3:
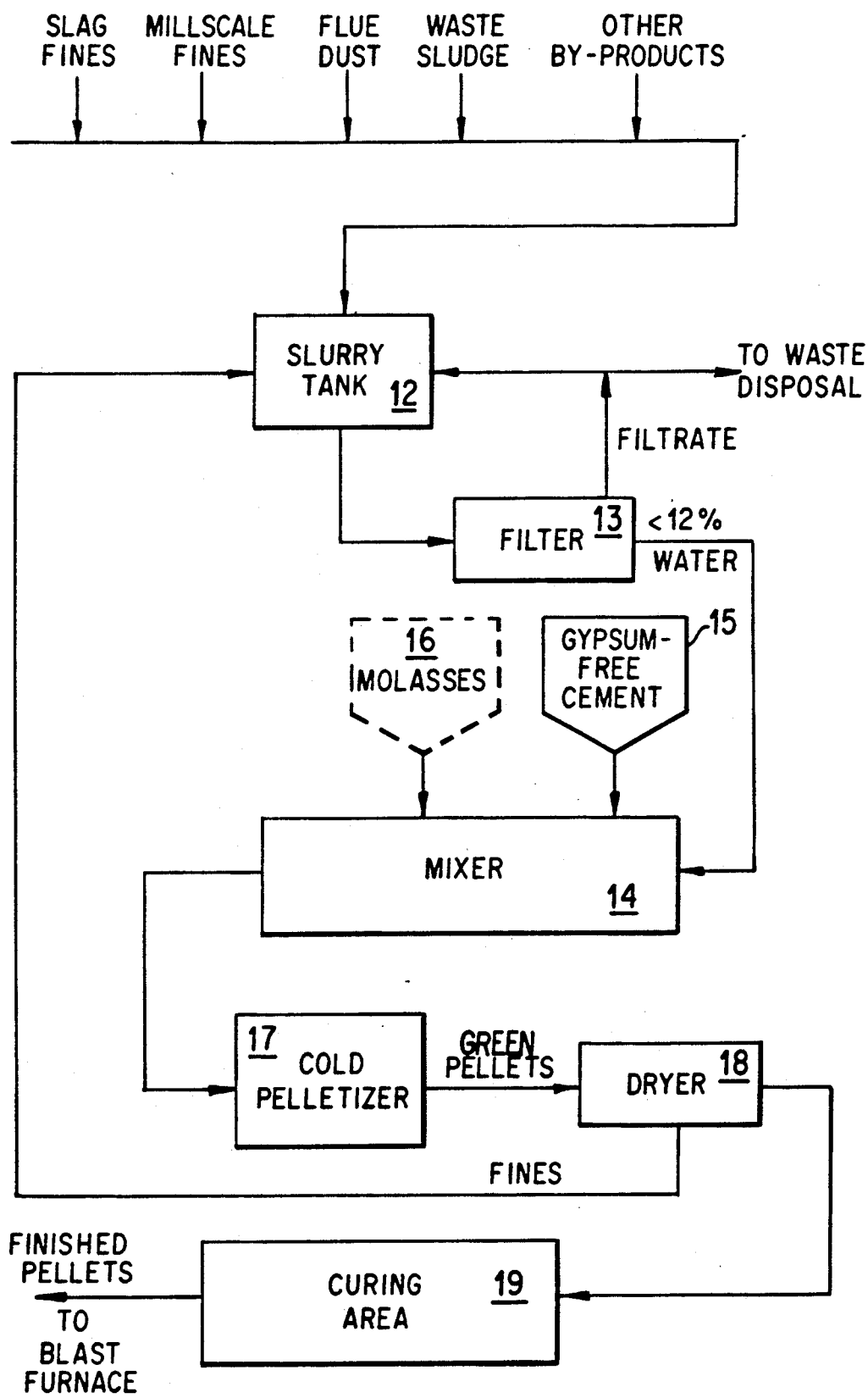
FIG. 3 is a flow diagram of the basic process of making the pellets of the present invention.
Figure 4:
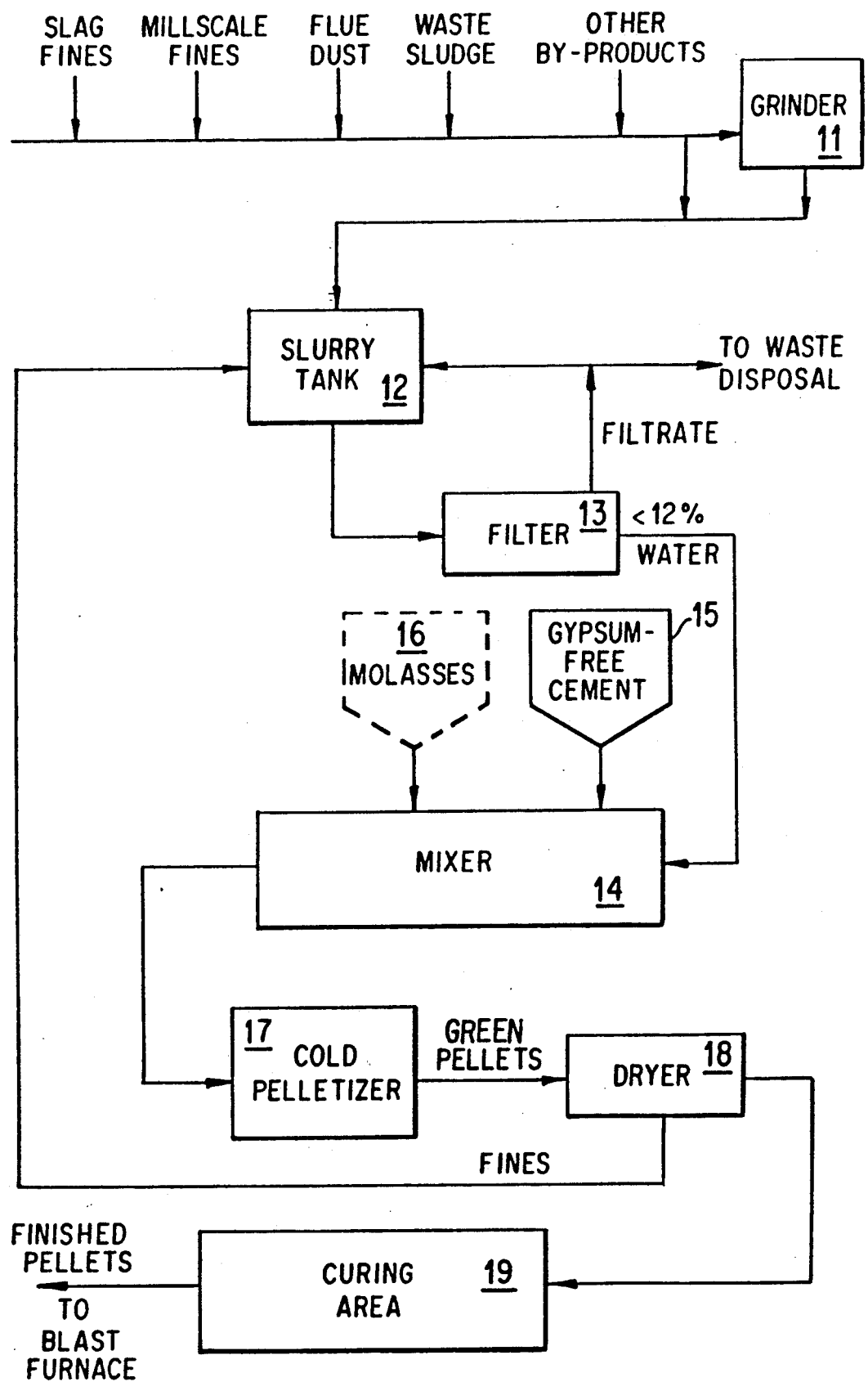
FIG. 4 is a flow diagram of a preferred embodiment of the present invention for making pellets.

Referring to FIGS. 3 and 4 for the pelletizing process, the various steel mill by-product materials, such as iron pellet fines, steelmaking slag, mill scale, blast furnace flue dust, and sludges are preferably conveyed or pumped to the grinding mill 11 if they consist of solid material with a Blaine Surface Fineness less than 1,000 $cm^2/g$ or directly to the slurry tank 12 if the solid material mix is equal to or finer than 1,000 $cm^2/g$.

Material fed to the grinding mill 11 in the preferred embodiment is ground to a fineness of at least 1,000 $cm^2/g$ and then diverted to the slurry tank 12 where it is thoroughly mixed with the finer by-product materials that were fed directly to the slurry tank 12.

Water or filtrate from the filtration step of this process is added as needed to maintain a density in the slurry tank 12 of between 10% and 50% solids. The slurry is then pumped from the slurry tank 12 to the vacuum belt filter 13, or other suitable solids separation device known to those skilled in the art, where it is filtered to produce a by-product material filter cake comprising 88 to 92% solids. From the belt filter 13, the filter cake is conveyed into a mixing mill 14, such as a pug mill or other suitable mixing device known to those skilled in the art, where it is combined with the binder of the present invention—gypsum-free cement 15 and, if required, molasses or other sucrose residue 16. The sucrose residue is added only if the properties of the feed material require it to form the pellet properly or to retard the setting time of the binder for the pelletizing process.

This blended material is fed to a cold pelletizer 17 which preferably forms the by-product material into $\frac{1}{4}$ to $\frac{3}{4}$ inch pellets. The green pellets then pass through a screen/perforated belt dryer 18 that preferably operates in the temperature range of 300° to 400° F., using the most economical heat source available, to develop a hardened exterior surface on each pellet before the processed pellets are conveyed to the curing area 19. The fines captured from the dryer 18 are then returned to the slurry tank 12 for processing.

After curing to sufficient strength, the pellets are conveyed to and fed directly into the blast furnace. The fully cured pellets produced by this process are able to maintain their physical integrity such that at least 70% of the pellet material remains on a $\frac{1}{4}$-inch screen after 200 revolutions in the ISO-3271-1985 E Tumble Test Procedure ("Tumble Test").

For process control, the by-product material filter cake is fed from the filter 13 via a weigh-belt conveyor or related device known to those skilled in the art. The gypsum-free cement 16 and, if required, molasses or other sucrose residue 17 binder materials are then fed into the mixing device at rates to meet a predetermined ratio of binder to by-product material based on test runs of the particular feed mix. Preferably, the end product pellets consist of 3 to 6% gypsum-free cement and 0 to 2% molasses or other sucrose residue, by weight, with the remaining 92 to 97% by weight being by-product material and water. The percentages of gypsum-free cement and molasses or other sucrose residue, however, may need to be increased to a maximum of 10% by weight for each because of the variable surface area and grain fineness of the steel mill by-product feed material.

The gypsum-free cement used in both processes is an inorganic, hydraulic-setting cement with rapid setting capabilities. In the preferred embodiment, gypsum-free cement of high fineness having a Blaine Surface Fineness in excess of 4,000 cm$^2$/g is used in conjunction with molasses as the binder. Although economics and reduced strength requirements could permit the use of a coarser grade cement, the finer grade cement increases the ultimate strength of the briquettes or pellets, thus reducing fines in the material fed to the blast furnace. Cement mix additives known to those skilled in the art, which cause rapid setting or improve the ultimate strength of a cured agglomerate, may also be used in conjunction with a coarser grade cement as dictated by economics and briquette or pellet strength requirements.

It also should be noted that some gypsum may be tolerated in the gypsum-free cement provided it does not interfere with the operative properties of the briquette or pellet. In general, the overall gypsum content of the gypsum-free cement is reduced to roughly 50% of the gypsum content in a conventional Portland cement. The following typical chemical analyses quantify the chemical differences between a conventional Portland cement and the gypsum-free cement used in the present invention:

|  | Conventional Type III Portland Cement | Gypsum-Free, Inorganic, Hydraulic-Setting Cement |
| --- | --- | --- |
| $SiO_2$ | 21.71 | 21.99 |
| $Al_2O_3$ | 4.96 | 5.27 |
| $Fe_2O_3$ | 2.67 | 3.11 |
| CaO | 63.91 | 63.83 |
| MgO | 2.92 | 3.09 |
| $SO_3$ | 3.11 | 1.77 |
| $Na_2O$ | 0.19 | 0.19 |
| $K_2O$ | 0.69 | 0.75 |
| L.O.I. | 1.30 | 0.86 |

In the preferred embodiment for making briquettes, the "green" briquettes are moved to an enclosed curing area 10 to retain the moisture that is released as the briquettes cure so that the cement can hydrate in a humidified area. Similarly, in the preferred embodiment for making pellets, the "green" pellets are also moved to an enclosed curing area 19. This area can be provided by conveying the briquettes or pellets to an enclosed storage area or simply covering the briquettes or pellets with a tarp. This enclosed curing method establishes stronger chemical bonds to increase the ultimate strength of the briquettes or pellets, thus reducing fines in the material fed to the blast furnace.

While a presently preferred embodiment of practicing the invention has been shown and described with particularity in connection with the accompanying drawings, the invention may be otherwise embodied within the scope of the following claims.

We claim:

1. A briquette capable of being fed directly into an iron blast furnace as part of the overall furnace burden comprising steel mill by-product material up to and including a size capable of passing through a $\frac{1}{4}$-inch screen and a binder comprising gypsum-free, inorganic, hydraulic-setting cement and a sucrose residue; wherein the by-product material comprises about 70 to 92% by weight of the briquette, the gypsum-free cement portion of the binder comprises about 4 to 15% by weight of the briquette, and the sucrose residue portion of the binder comprises about 4 to 15% by weight of the briquette.

2. A briquette as described in claim 1 wherein the by-product material comprises about 70 to 92% by weight of the briquette, the gypsum-free cement portion of the binder comprises about 4 to 15% by weight of the briquette, and the sucrose residue portion of the binder comprises about 4 to 15% by weight of the briquette.

3. A briquette as described in claim 1 wherein the by-product material comprises about 82 to 92% by weight of the briquette, the gypsum-free cement portion of the binder comprises about 4 to 10% by weight of the briquette, and the sucrose residue portion of the binder comprises about 4 to 8% by weight of the briquette.

4. A briquette as described in claim 1 wherein the sucrose residue comprises molasses.

5. A briquette as described in claim 1 in which at least 70% of the by-product material remains on a 1-4-inch screen after 200 revolutions in the ISO-3271-1985 E Tumble Test Procedure.

6. A pellet capable of being fed directly into an iron blast furnace as part of the overall furnace burden comprising steel mill by-product material, water and a binder of sucrose and gypsum-free, inorganic, hydraulic-setting cement; wherein the by-product material and water comprise about 80 to 97% by weight of the pellet, the gypsum-free cement comprises about 3 to 10% by weight of the pellet, and the sucrose residue comprises up to 10% by weight of the pellet.

7. A pellet as described in claim 6 wherein the a sucrose residue comprises molasses.

8. A pellet as described in claim 7 wherein the by-product material and water comprise about 80 to 97% by weight of the pellet, the gypsum-free cement comprises about 3 to 10% by weight of the pellet, and the sucrose residue comprises about 0 to 10% by weight of the pellet.

9. A pellet as described in claim 6 wherein the by-product material and water comprise about 92 to 97% by weight of the pellet, the gypsum-free cement comprises about 3 to 6% by weight of the pellet, and the sucrose residue comprises up to 2% by weight of the pellet.

10. A pellet as described in claim 9 wherein the sucrose residue comprises molasses.

11. A pellet as described in claim 9 wherein at least 70% of the by-product material remains on a ¼-inch screen after 200 revolutions in the ISO-3271-1985 E Tumble Test Procedure.

* * * * *